Patented July 2, 1929.

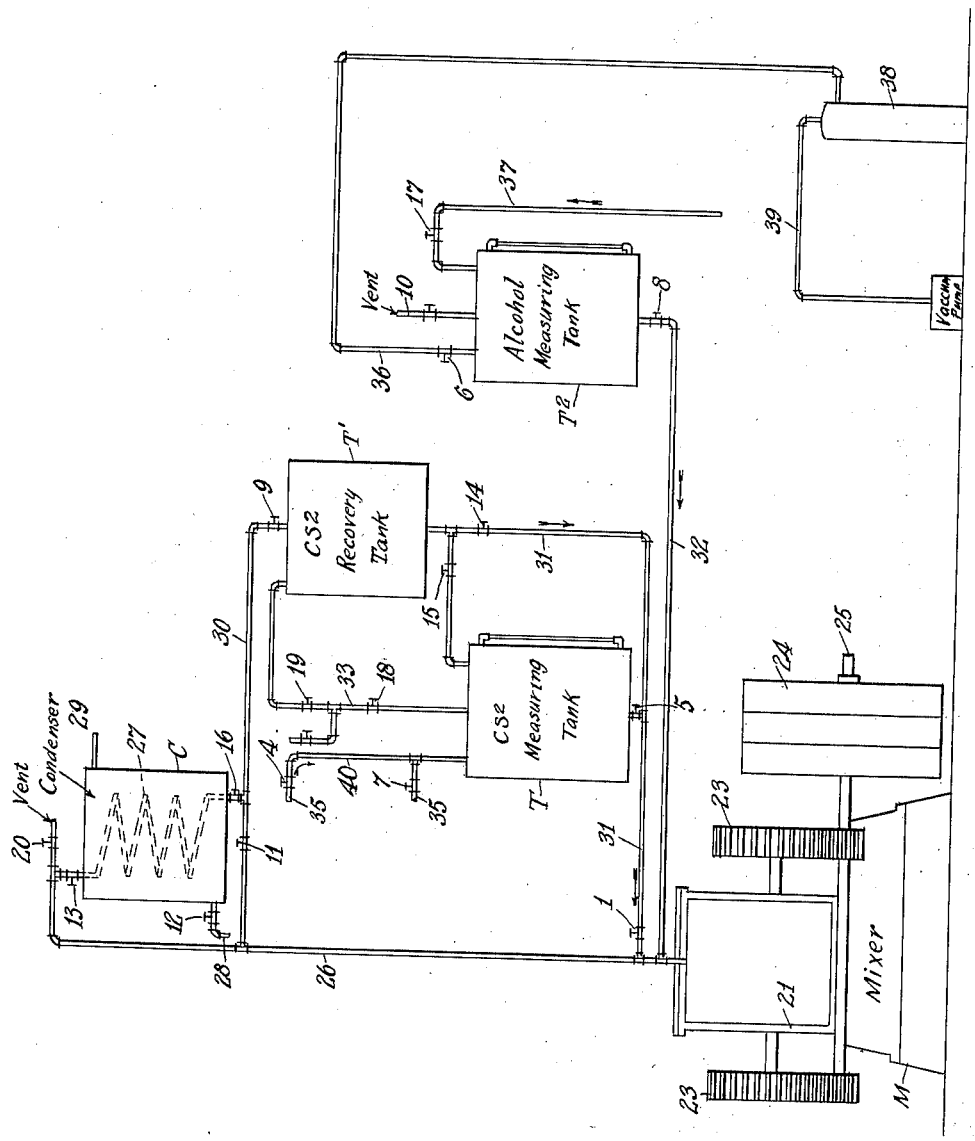

1,718,937

UNITED STATES PATENT OFFICE.

THOMAS W. BARTRAM AND HAROLD P. ROBERTS, OF NITRO, WEST VIRGINIA, ASSIGNORS TO THE RUBBER SERVICE LABORATORIES COMPANY, OF AKRON, OHIO, A CORPORATION OF OHIO.

MANUFACTURE OF ALKALI METAL XANTHATES.

Application filed November 8, 1926. Serial No. 146,878.

The present invention relates to a method for the manufacture of salts of xanthic acid, such as the organic and metallic salts and more particularly the alkali metallic salts, such as sodium, potassium and ammonium xanthate.

It has been proposed heretofore to produce the alkali metal xanthates, such as sodium or potassium xanthate, by causing a reaction to take place between sodium or potassium hydroxide, carbon bisulphide and ethyl alcohol by a number of different processes such as in the presence of an excess of alcohol, in the presence of added water, by employing a metallic alkali crystallized from water and containing water of crystallization, by using an inert liquid solvent and the like. These various processes either introduced cumbersome methods of procedure or, particularly in those processes where water was added, resulted in the production of a product containing considerable quantities of side reaction products, such as sulphides, thiocarbonates and the like. Furthermore, the xanthate obtained was frequently decomposed in part by the drying of a product wet with appreciable quantities of water.

The reaction between a caustic alkali, such as potassium hydroxide, carbon bisulphide and ethyl alcohol in the production of potassium ethyl xanthate, is most simply represented as follows:

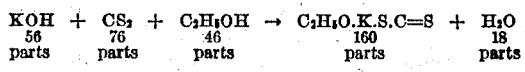

| KOH | + | CS$_2$ | + | C$_2$H$_5$OH | → | C$_2$H$_5$O.K.S.C=S | + | H$_2$O |
| 56 parts | | 76 parts | | 46 parts | | 160 parts | | 18 parts |

Where then the interacting components are taken in equimolecular proportions it is seen that in addition to one molecular proportion of the xanthate, one molecular proportion of water is produced, which represents approximately 11.25% by weight of the reaction products formed. In operating our process, we have found it to be advantageous to cause the reaction shown above to take place relatively slowly. This we accomplish by adding the carbon bisulphide to a mixture of alcohol and potassium hydroxide at a regulated rate and over an extended period of time. Furthermore, we have found it to be unnecessary to have all the caustic potash or other alkali completely dissolved in the alcohol at the beginning of the operation and dissolve only as much as is soluble in the quantity of alcohol taken. To complete the solution of the remainder of the alkali, we take advantage of the water produced as shown in the above reaction, to dissolve a further quantity of the caustic potash present and in this manner we avoid adding water to the mixture at the start thereby preventing undue dilution of the mixture and avoiding formation of substantial quantities of undesirable side reaction products.

Accordingly, one of the objects of this invention is to provide an improved process of producing alkali metallic xanthates wherein a mixture of an alkali hydroxide, carbon bisulphide and an alcohol are reacted in the absence of an added solvent and without the use of any water other than that originally present in the alcohol or produced by the reaction. Inasmuch as the alcohol preferably employed is the grade containing approximately 95 to 98% alcohol by volume, it is evident that comparatively little water is present other than that produced by the reaction.

Other and further objects of the invention will appear from the more detailed description of the invention hereinafter set forth with reference to the accompanying drawing which represents in sectional view one preferred arrangement of an apparatus for practicing the process.

Referring to the drawing, a quantity (approximately 325 pounds) of caustic potash is placed within the mixing chamber of a mixer M, which preferably is of any well known type, such as a Werner and Pfleiderer mixer. The caustic potash employed is preferably ground finely enough so that the largest particles present will not leave a core of material unreacted upon by the alcohol and carbon bisulphide at the completion of the reaction. Commercial, high grade, flake caustic soda or potash is most suitable for use in the process. After the caustic has been placed in the chamber, the cover is securely fastened thereupon and the chamber connected with a line 26 leading to the condenser C.

Alcohol is then placed in the alcohol measuring tank T$^2$ by closing the valve 8 and the valve in the vent line 10 and opening the valves 6 and 17, and withdrawing alcohol from storage (not shown) through the line 37 and discharging it into the tank T². The alcohol is drawn into the tank by means of a partial vacuum applied thereto by a vacuum pump connected by lines 39 and 36 to the tank T². A trap 38 is interposed between the lines 36 and 39 to collect therein any liquid that may happen to be present in the line 36. When the tank contains the desired quantity of alcohol, the vacuum is shut off, valves 17 and 6 are closed and the valve in the vent line 10 is opened. The valve 8 is then opened and approximately 250 pounds of alcohol are flowed from the tank T² through the line 32 into the chamber of the mixer. After the desired quantity of alcohol has been added to the caustic in the mixer, the valve 8 is closed to discontinue further supply of alcohol thereto. A measuring gage attached to the tank T² indicates the quantity of alcohol withdrawn.

A suitable cooling fluid, such as water, is then flowed through the jacket 21 of the mixer M. Power from any suitable source supplied to the wheel 24 rotates the shaft 25 which carries gears meshing with gears of wheels 23. The shaft, centrally supporting wheels 23 carries paddles (not shown) positioned within the chamber of the mixer and these paddles are rotated by movement of the wheels 23. A complete and homogeneous mixture of the caustic and alcohol is formed. A portion of the caustic is dissolved in the alcohol but approximately one-half of the quantity of caustic taken remains undissolved at this step of the operation. In other words, a saturated alcoholic solution of caustic is formed while a substantial proportion of the caustic taken remains in the solid phase.

Inasmuch as the mixing and dissolving of the caustic in the alcohol evolves considerable heat, the stirring and grinding operation is preferably continued until the temperature of the mixture has been lowered to about 20° C. by means of the cooling medium flowing through the jacket of the mixer as described. Furthermore, to avoid loss of any alcohol, provision is made to condense any vapors evolved and return the condensate to the mixer as is hereinafter set forth in more detail. Carbon bisulphide contained in the tank T is then flowed into the mixer by opening the valve 5 and valve 1 in line 31. The carbon bisulphide should preferably be supplied at such a rate that the heat evolved in the production of xanthate in the mixer should not be great enough to heat the contents of the mixer unduly. Although the manufacture of xanthate has been found to proceed satisfactorily without decomposition of the product at temperatures varying from approximately 0° to 50° C., we have found that for most purposes it is desirable to maintain a temperature of approximately 35° C. in the contents of the mixing chamber.

In order to maintain the desired working conditions described, the carbon bisulphide is supplied to the mixer at a rate of not more than 5% per minute of the total quantity required. Preferably the carbon bisulphide is flowed into the mixer at the rate of approximately one to two pounds per minute. In order to control the flow of carbon bisulphide more accurately, a needle valve (not shown) may be placed in the line 31 adjacent to the valve 1. The flow of carbon bisulphide is continued in the manner described until approximately 380 parts by weight have been run into the mixer. This quantity of carbon bisulphide is a slight excess over the amount actually required for combination with the quantities of alcohol and alkali set forth for the manufacture of xanthate and is preferably employed when potassium xanthate is manufactured. If the sodium salt, and some other salts of xanthic acid are being prepared, however, it is usually preferable to employ only the theoretical quantity required for reacting with the other materials taken. The quantities of ingredients set forth in the example represent substantially five molecular proportions of each of the reactive components.

The formation of potassium ethyl xanthate from caustic potash, alcohol and carbon bisulphide takes place very readily and rapidly and the reaction is complete soon after the total quantity of carbon bisulphide has been added to the mix. Therefore, as soon as the quantity of carbon bisulphide required has been flowed into the reaction chamber of the mixer M, the valves 5 and 1 are closed and hot water or steam sufficient to heat the contents of the chamber to a temperature slightly above the boiling point of carbon bisulphide, is flowed through the jacket of the mixer. Vapors evolved pass through the line 26 into the coil 27 of the condenser C (to which cooling means is supplied through pipe 12 and withdrawn through line 29) and the condensate is flowed through line 30 to the carbon bisulphide recovery tank T'.

The condensed carbon bisulphide may, of course, be used in the manufacture of other batches of xanthate by withdrawing it through line 31 and flowing it direct to the mixer, or by running it into the tank T through the line controlled by valve 15. In case any water is present in the carbon bisulphide, this may be readily separated therefrom by closing the valves 14, 15 and 18, opening the valves 19 and allowing the contents of the tank T' to overflow through a vent line until the water is completely removed. The tank T is initially charged with carbon bisulphide by flowing the material from a storage tank (not shown) through line 40 controlled by valve 4.

After the uncombined carbon bisulphide has been removed from the potassium ethyl xanthate in the manner described, the product is removed from the chamber of the mixer and dried in a current of air maintained at a temperature of approximately 70° C. Sodium xanthate should be dried at a temperature of approximately but not above 65° C. Inasmuch as sodium ethyl xanthate crystallizes with one molecule of water of crystallization, and since heat decomposes the material, it is unnecessary and impracticable to attempt to produce an anhydrous compound. Although air drying of the product at lower temperatures might be employed, this is a relatively long and tedious operation. Furthermore, it has been found that moderate heating of the xanthate as described is ordinarily desirable to remove traces of some of the volatile by-products of the reaction and to oxidize any undesirable sulfur containing compounds which may be present.

It is not necessary to employ any excess of carbon bisulphide in the process as described and no excess of this material should be employed in the manufacture of xanthates that are at all decomposed or affected by heating to temperatures above 60° C. Where no excess of this material is employed over the molecular proportion indicated in the equation as set forth, the valve 9 in the line 30 is closed while the valve 11 in line 30 is opened and any carbon bisulphide volatilized from the chamber is condensed and returned to the reacting mixture. The apparatus should preferably be employed in this manner while the caustic is first mixed with the alcohol.

It is apparent that during the course of the reaction, the uncombined alcohol present in the chamber is continually maintained saturated with caustic until all of the substances have been consumed in the reaction taking place. The solution of this caustic is aided, as previously mentioned, by the water produced in the reaction but after the reaction has been completed, if equi-molecular proportions of the various ingredients have been employed, there are no excess chemicals to be removed and the water evolved in the reaction is present in the xanthate as water of crystallization. The product in such a case is then ready for use for any desired purpose although a drying step or heat treatment at moderate temperatures may be employed to remove volatile side reaction products if any be present.

Not only may potassium xanthate, or potassium ethyl xanthate as the material is also known, be prepared by the described process, but we have also successfully manufactured such other related products as sodium xanthate, ammonium xanthate, aniline-ethyl xanthate, and others by operating in the manner as set forth. Furthermore, certain other xanthates such as zinc-ethyl-xanthate, diphenyl-guanidine-ethyl-xanthate, di-ortho-tolyl-guanidine-ethyl xanthate, and others which have heretofore been obtained in an unstable form may be manufactured as stable compounds from potassium xanthate produced by our preferred process.

It is to be understood that our invention is not limited to the exact proportions and details of operation as set forth in the example, but is limited solely by the claims attached hereto as a part of this specification, wherein we intend to claim all novelty inherent in our invention as is permissible in view of the prior art. Moreover, the attached claims are intended to cover only the process as actually set forth and do not include processes wherein added solvents or inert materials are employed.

What we claim is:

1. The process of manufacturing metallic xanthate which comprises mixing substantially equi-molecular proportions of alcohol and a metallic hydroxide, such hydroxide being present in alcoholic solution and in the solid phase, and adding carbon bisulfid thereto at a rate such that substantially no uncombined carbon bisulfid exists in the solution.

2. The process of manufacturing potassium xanthate which comprises preparing a homogeneous mixture of substantially equi-molecular proportions of ethyl alcohol and potassium hydroxide, such hydroxide being present in alcoholic solution and in the solid phase, and adding carbon bisulfid thereto at a rate such that substantially no uncombined carbon bisulfid exists in the solution.

3. The process of manufacturing potassium xanthate which comprises adding carbon bisulphide to a saturated alcoholic solution of potassium hydroxide at a rate such that substantially no uncombined carbon bisulphide exists in the solution.

4. The process of manufacturing potassium xanthate which comprises mixing equi-molecular proportions of potassium hydroxide and alcohol, adding an equivalent molecular proportion of carbon bisulphide thereto at the rate of not more than 5% per minute, and heat treating the reaction product at a temperature below 70° C. whereby unstable side reaction products are decomposed and volatilized.

5. The process of manufacturing potassium xanthate which comprises mixing equi-molecular proportions of potassium hydroxide and ethyl alcohol containing from 95 to 98% of alcohol by volume, adding an equivalent molecular proportion of carbon bisulphide thereto at the rate of from one tenth to two per cent per minute, and heat treating the reaction product at a temperature below 70° C. whereby unstable side reaction products are decomposed and volatilized.

6. The process of manufacturing a metallic xanthate which comprises homogeneously mixing equi-molecular proportions of alcohol and a metallic hydroxide, cooling said mixture to approximately 20° C., and adding thereto an equivalent molecular proportion of carbon bisulfid at a rate of from one-tenth to two per cent per minute while maintaining the temperature of the reacting mixture between 0° to 50° C. and heat treating the reaction product on completion of the reaction at a temperature below 70° C. whereby unstable side reaction products are decomposed and volatilized.

In testimony whereof we affix our signatures.

THOMAS W. BARTRAM.
HAROLD P. ROBERTS.